United States Patent
Cheng et al.

(10) Patent No.: US 9,275,274 B2
(45) Date of Patent: Mar. 1, 2016

(54) SYSTEM AND METHOD FOR IDENTIFYING HANDWRITING GESTURES IN AN IN-VEHICLE INFORMATION SYSTEM

(71) Applicant: Robert Bosch GmbH, Stuttgart (DE)

(72) Inventors: You-Chi Cheng, Atlanta, GA (US); Zhe Feng, Mountain View, CA (US); Chin-Hui Lee, Atlanta, GA (US); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 14/206,916

(22) Filed: Mar. 12, 2014

(65) Prior Publication Data

US 2014/0270382 A1 Sep. 18, 2014

Related U.S. Application Data

(60) Provisional application No. 61/778,702, filed on Mar. 13, 2013, provisional application No. 61/777,601, filed on Mar. 12, 2013.

(51) Int. Cl.
*B60R 1/00* (2006.01)
*G06K 9/00* (2006.01)
*G06F 3/01* (2006.01)

(52) U.S. Cl.
CPC .............. *G06K 9/00355* (2013.01); *B60R 1/00* (2013.01); *G06F 3/017* (2013.01); *B60R 2300/205* (2013.01); *B60R 2300/8006* (2013.01)

(58) Field of Classification Search
None
See application file for complete search history.

(56) References Cited

U.S. PATENT DOCUMENTS

| 4,653,107 | A  | * | 3/1987 | Shojima et al. ............... 382/189 |
| 5,917,941 | A  | * | 6/1999 | Webb et al. ................... 382/177 |
| 6,917,693 | B1 | * | 7/2005 | Kiridena et al. .............. 382/104 |
| 7,050,606 | B2 |   | 5/2006 | Paul et al. |

(Continued)

FOREIGN PATENT DOCUMENTS

| KR | 10-2010-0136984 A | 12/2010 |
| WO | 2013128291 A2 | 9/2013 |

OTHER PUBLICATIONS

Gauvain, Jean-Luc et al., Maximum a Posteriori Estimation for Multivariate Gaussian Mixture Observations of Markov Chains, IEEE Transactions on Speech and Audio Processing, vol. 2, No. 2, Apr. 1994.

(Continued)

*Primary Examiner* — Bhavesh Mehta
*Assistant Examiner* — Menatoallah Youssef
(74) *Attorney, Agent, or Firm* — Maginot Moore & Beck LLP (57) ABSTRACT

An in-vehicle information system includes a camera and a controller that accept gesture input. A controller receives frames of video data and generates trajectory data for a movement of a hand in the video data. The controller uses a first hidden Markov model (HMM) to decode a sequence of strokes from the trajectory data, removes a starting and ending stroke to form an edited stroke sequence, and re-normalizes the strokes in the edited stroke sequence. The controller uses a second HMM corresponding to a predetermined set of characters to identify a character corresponding to the re-normalized edited stroke sequence.

14 Claims, 6 Drawing Sheets

(56) References Cited

U.S. PATENT DOCUMENTS

2008/0253613 A1   10/2008   Jones et al.
2009/0136136 A1*  5/2009    Mori et al. .................... 382/187
2009/0278915 A1* 11/2009    Kramer et al. ................. 348/48
2011/0254765 A1* 10/2011    Brand .......................... 345/158
2012/0280901 A1  11/2012    Kim

OTHER PUBLICATIONS

International Search Report and Written Opinion corresponding to PCT Application No. PCT/US2014/024826, mailed Jun. 30, 2014 (13 pages).

\* cited by examiner

SYSTEM AND METHOD FOR IDENTIFYING HANDWRITING GESTURES IN AN IN-VEHICLE INFORMATION SYSTEM

CLAIM OF PRIORITY

This application claims priority to U.S. Provisional No. 61/777,601, which is entitled "System And Method For Identifying Handwriting Gestures In An In-Vehicle Information system," and was filed on Mar. 12, 2013, the entire contents of which are incorporated herein by reference. This application claims further priority to U.S. Provisional Application No. 61/778,702, which is entitled "System And Method For Identifying Handwriting Gestures In An In-Vehicle Information system," and was filed on Mar. 13, 2013, the entire contents of which are incorporated herein by reference.

FIELD

This disclosure relates generally to the field of automated assistance and, more specifically, to systems and methods that enable in-vehicle information systems to identify handwriting gestures.

BACKGROUND

Modern motor vehicles often include one or more in-vehicle information systems that provide a wide variety of information and entertainment options to occupants in the vehicle. Common services that are provided by the in-vehicle information systems include, but are not limited to, vehicle state and diagnostic information, navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

User interfaces for an in-vehicle information system need to enable the user to obtain the information being sought without undue distraction. While most such information systems use control knobs or touch screens with displays for user interaction, some systems incorporate multiple modalities, such as speech and gesture recognition. In these systems that use multiple modalities, gesture input plays a key role. One challenge for in-vehicle hand gesture recognition arises from the diversity of possible hand gestures. Some of this diversity occurs because a driver's focus is on vehicle operation rather than on performing a gesture. Consequently, hand gestures are noisy and may include meaningless components, such as making a long starting stroke before actually performing the gesture. Including such noisy strokes in the gesture can lead to misidentification of a gesture. Another contributing factor to gesture diversity is the variation in illumination conditions in a vehicle. Most generic gesture recognition systems are built for in-door environments. Different color space representations, skin regions versus non-skin regions classification rules, automatic white balance calibration, or depth information are often used to filter the cluttered environmental conditions. Because in-vehicle environments differ from one another so drastically, these software tools are not reliably successful in identifying hand gestures. Consequently, improvements in the ability of in-vehicle information systems to recognize hand gestures are worthwhile.

SUMMARY

An in-vehicle information system addresses the diversity of hand gestures by using adaptive skin detectors. These detectors are configured to use both the corresponding background and foreground information along with Maximum a Posteriori (MAP) adapted skin models to enhance the detector performance and robustness. This system also incorporates stroke modeling rather than whole letter modeling. Stroke modeling for hand gestures is similar to stroke modeling for hand written Chinese character recognition or phoneme modeling for speech recognition. This stroke modeling enhances a system's ability to distinguish hand gestures by explicitly modeling the intra-stroke correlation with geometric properties as a post processing stage. Such modeling also has the potential to remove noisy strokes.

In one embodiment, an in-vehicle information system configured to receive gesture input from an operator has been developed. The in-vehicle information system includes a first camera configured to generate image data of an interior surface in a vehicle and a hand of an operator in the vehicle that moves on the interior surface, a controller operatively connected to the first camera and at least one component in the in-vehicle information system. The controller is configured to receive a plurality of frames of image data from the first camera, identify a location of the hand of the operator in each frame of the plurality of frames, generate trajectory data corresponding to changes in the location of the hand in the plurality of frames, generate a decoded sequence of strokes from the for the hand from the trajectory data with reference to a first hidden Markov model (HMM), remove at least one of a first stroke and a last stroke from the decoded sequence of strokes to generate an edited sequence of strokes, normalize trajectory data associated with each stroke in the edited sequence of strokes, identify a character corresponding to the normalized trajectory data associated with the edited sequence of strokes with reference to a second HMM, and operate the at least one component in the in-vehicle information system in response to the identified character.

In another embodiment, a method for receiving gesture input from an operator in an in-vehicle information system has been developed. The method includes receiving with a controller a plurality of frames of image data generated by a first camera, identifying with the controller a location of a hand of an operator in each frame of the plurality of frames, generating with the controller trajectory data corresponding to changes in the location of the hand in the plurality of frames, generating with the controller a decoded sequence of strokes from the trajectory data with reference to a first hidden Markov model (HMM), removing with the controller at least one of a first stroke and a last stroke from the decoded sequence of strokes to generate an edited sequence of strokes, normalizing with the controller trajectory data associated with each stroke in the edited sequence of strokes, identifying with the controller a character corresponding to the normalized trajectory data associated with the edited sequence of strokes with reference to a second HMM, and operating with the controller at least one component in the in-vehicle information system in response to the identified character.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "gesture" refers to a series of hand movements that correspond to a predetermined input for an in-vehicle information system. A gesture is formed from a plurality of smaller hand movements that are referred to as "strokes." Each stroke is, for example, a continuous movement of the hand in a straight line or on a curve between a starting location and an ending location. Some gestures correspond to individual characters in an alphabet or symbolic lexicon. As used herein, the term "character" refers to a letter, number, ideogram, punctuation, or other symbol that is recognized as a form of input for the in-vehicle information system and that can be formed from a gesture. As used herein, the term "lexicon" refers to a set of predetermined characters that are recognized as valid input characters for an in-vehicle information system. An in-vehicle information system receives one or more characters as input to control the operation of software programs that are executed by one or more processors in the in-vehicle information system and to control components in the vehicle. As used herein, the term "component" refers to any electrical, mechanical, hydraulic, pneumatic or electromechanical device in the vehicle that is connected to a digital control device and can be operated or reconfigured based on gesture input from a vehicle operator.

Figure 1:
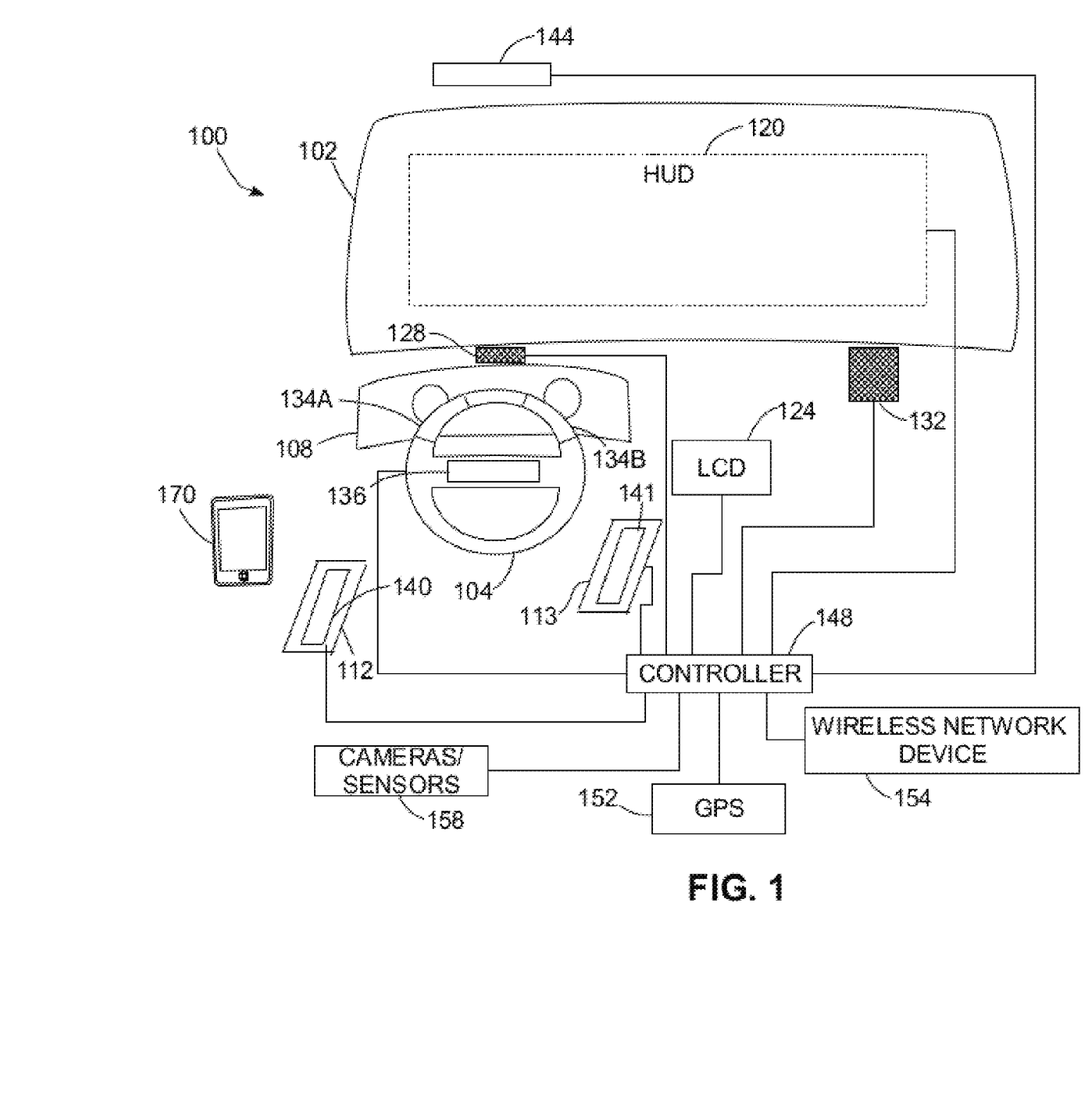
FIG. 1 is a schematic view of components of an in-vehicle information system in a passenger compartment of a vehicle.

Described herein is an in-vehicle information system 100 that integrates multiple input and output devices and is configured to identify characters from hand gestures provided by an operator in the vehicle. The in-vehicle information system 100 includes the components described below in conjunction with FIG. 1. In FIG. 1, an in-vehicle information system 100 includes a head-up display (HUD) 120, one or more console LCD panels 124, one or more input microphones 128, one or more output speakers 132, input reference regions 134A, 134B, and 136 over a steering wheel area 104, input regions 140 and 141 on nearby armrest areas 112 and 113 for one or both of left and right arms, respectively, and a motion sensing camera 144. The LCD display 124 optionally includes a touchscreen interface to receive haptic input.

A controller 148 is operatively connected to each of the components in the in-vehicle information system 100. The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 also includes a memory, such as a solid state or magnetic data storage device, that stores programmed instructions that are executed by the controller 148 for operation of the in-vehicle information system 100. In some embodiments, the controller 148 connects to or incorporates additional components, such as a global positioning system (GPS) receiver 152 and wireless network device 154, to provide navigation and communication with external data networks and computing devices. The in-vehicle information system 100 also includes one or more external cameras and sensors 158 that provide video and other sensor data about the environment around the vehicle to assist the operator in driving and parking the vehicle. The in-vehicle information system 100 is integrated with conventional components that are commonly found in motor vehicles including a windshield 102, dashboard 108, and steering wheel 104.

In the system 100, the input regions 134A, 134B, 136, and 140 provide a surface for a vehicle operator to enter input data using hand motions or gestures. In one embodiment, the input regions include gesture sensor devices, such as infrared or Time of Fly (TOF) sensors, which identify input gestures from the operator. In another embodiment, the camera 144 is mounted on the roof of the passenger compartment and views one or more of the gesture input regions 134A, 134B, 136, 140, and 141. In addition to gestures that are made while the operator is in contact with a surface in the vehicle, the camera 144 records hand, arm, and head movement in a region around the driver, such as the region above the steering wheel 104. The LCD panel 124 also includes a touch sensor, such as a resistive or capacitive touchscreen sensor, and the vehicle operator enters haptic input, such as gestures, through direct contact with the touchscreen LCD panel 124.

On the steering wheel 104, the touch input regions 134A and 134B are located on the circumference of the steering wheel 104, where a vehicle operator commonly places his or her hands during operation of the vehicle. In some circumstances the operator also contacts the touch input region 136 to activate, for example, a horn in the vehicle. Additionally, the operator may place an arm on the armrest 112. The controller 148 is configured to ignore touch inputs received from the touch regions except when the vehicle operator is prompted to enter input data using the touch interface to prevent spurious inputs from the touch regions.

In some embodiments, the controller 148 is configured to identify written or typed input that is received from one of the touch interface regions in addition to identifying simple gestures entered through the touch regions. For example, the operator engages the touch regions 136 or 140 with a finger to write characters or numbers. In another embodiment, the controller 148 displays a simplified virtual keyboard using the HUD 120 and the operator selects keys using the touch input regions 136 or 140 while maintaining eye contact with the environment around the vehicle through the windshield 102.

The microphone 128 generates audio data from spoken input received from the vehicle operator or another vehicle passenger. The controller 148 includes hardware, such as DSPs, which process the audio data, and software components, such as speech recognition software, to identify voice commands. Additionally, the controller 148 includes hardware and software components that enable generation of synthesized speech output through the speakers 132 to provide aural feedback to the vehicle operator and passengers.

The in-vehicle information system 100 provides visual feedback to the vehicle operator using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the vehicle operator. The controller 148 displays visual feedback using the HUD 120 to enable the operator to view the environment around the vehicle while receiving visual feedback. The controller 148 typically displays simplified data on the HUD 120 in a region corresponding to the peripheral vision of the vehicle operator to ensure that the vehicle operator has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the operator wears during operation. As described below, either or both of the HUD 120 and the LCD display 124 display graphics and video data that assist the vehicle operator in using the in-vehicle information system.

In some operating modes, the in-vehicle information system 100 operates independently, while in other operating modes, the in-vehicle information system 100 interacts with a mobile electronic device 170, such as a smartphone, tablet, notebook computer, or other electronic device. The in-vehicle information system communicates with the smartphone 170 using a wired interface, such as USB, or a wireless interface such as Bluetooth. The in-vehicle information system 100 provides a user interface that enables the operator to control the mobile electronic device 170 with reduced distraction. For example, the in-vehicle information system 100 provides a combined voice and gesture based interface to enable the vehicle operator to make phone calls or send text messages with the mobile electronic device 170 without requiring the operator to hold or look at the device 170. In some embodiments, the device 170 includes various devices such as GPS and wireless networking devices that complement or replace the functionality of devices that are housed in the vehicle.

Figure 2:
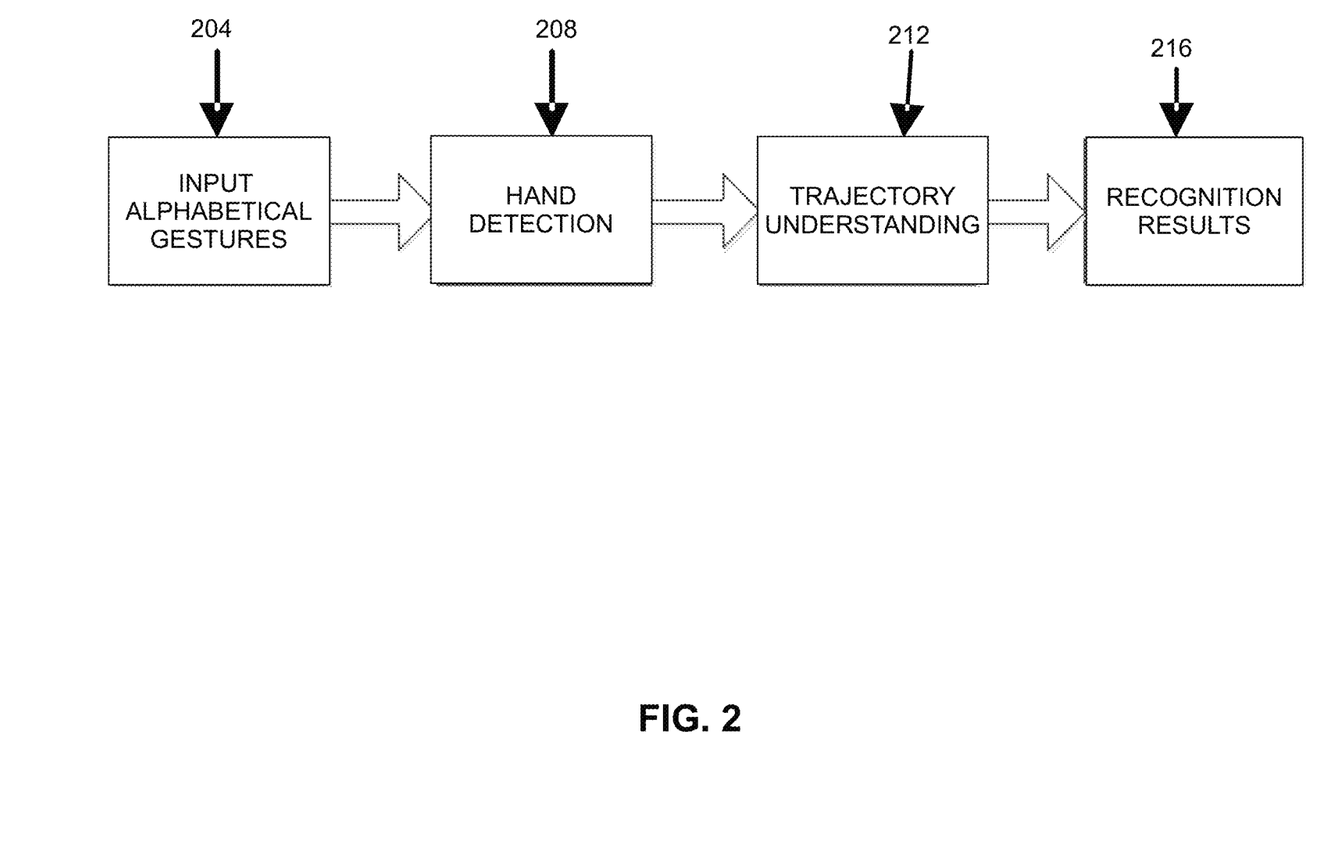
FIG. 2 is a system diagram of a hand gesture recognition subsystem in the in-vehicle information system of FIG. 1.

A block diagram of the hand gesture recognition portion of system 100 is shown in FIG. 2. The hand gesture recognition system 200 includes a video capture module 204, a hand detection and tracking module 208, a stroke decoding module 212, and a gesture recognition module 216. The term "module" refers to a controller executing programmed instructions stored in a memory operatively connected to the controller to perform a task or function or that operates one or more components to perform the task or function. With further reference to FIG. 2, the video capture module 204 operates one or more cameras to obtain digital data of a field of view. The digital data of the field can include a hand gesture. If the video capture module detects the presence of a hand gesture in the field of view data, the captured image data are delivered to the hand detection and tracking module 208 to locate and identify the corresponding trajectory of the gesture. To identify the gesture trajectory, hand locations in the image data are detected and the corresponding trajectory identified. The hands are located using frame-by-frame detection or tracking techniques, and the trajectory is identified by tracking several feature points of the hand or the center of mass of the hand. The identified trajectory of the stroke is provided to the stroke based decoding module 212 for identifying a plurality of stroke moves. These strokes are identified with reference to data stored in a memory that correspond to several commonly used strokes from human writing patterns, such as lines, arcs, and ellipses, in different orientations. These commonly used gestures can be encoded in a stored lexicon so these basic strokes serve as elements identified within a gesture. The lexicon also includes data corresponding to meaningless strokes, such as gesture starting or gesture ending strokes. These data are used to identify strokes not useful for gesture identification so these strokes can be removed from the gesture to better normalize the whole gesture sequence. Data corresponding to the plurality of strokes are then provided to the recognition module 216, which analyzes the stroke data to recognize the gesture. To decode stroke sequences, a two pass Hidden Markov Model (HMM) is used with geometric data to identify the two most likely hand gestures. This process is described in more detail below. Alternatively, other HMMs for stroke modeling can also be used, as well as other modeling techniques, such as Conditional Random Field (CRF) modeling. Additionally, methods, such as MRF or attribute based graphs, which are known for hand writing text recognition, can be used to analyze the stroke data. Several candidate stroke partitions can be compared using these methods on these structural models to make a final decision based on the gesture recognition. This stroke analysis also enables the trajectory data to detect different handwriting styles or stroke writing orders, which increases the tolerance and robustness of the hand gesture recognition system for different users and writing styles.

In further detail, a robust hand or body part detector for human gesture recognition requires accurate signal acquisition. During the collection of the image data, automatic white balance calibration is first used to adjust the color distribution. To enhance the camera data collection, LED light is used to minimize the effect of different illumination conditions. Also, an infrared camera can be used to obtain depth information so that the foreground object can be reliably extracted. Additionally, the video capture module 204 includes a post-processing stage that is implemented with programmed instructions that enable a processor to detect skin color in the camera image data. These instructions use specific thresholds adapted for better skin color detection. Different color space representations and skin color models are also used in different application domains and models. For example, color tracking using Expectation Maximization (EM) processing can be useful, while adaptive techniques based on refining the model with false detection samples can also be used to enhance the skin detection performance. Because the hand gesture detection is done with reference to a frame sequence, background and foreground correlation in the skin detection modeling along with the use of Maximum a Posteriori (MAP) adaptation enables the model conditions to be adjusted so the mismatch between the training recording environment and that of the image data can be reduced.

Stroke modeling in the system 200 is also important. The most commonly used tools for this modeling are based on sequential modeling, such as HMMs or finite state machines (FSMs), which are more flexible than HMMs. In previously known systems, a whole gesture is modeled by a single HMM or FSM, and the model that gives the highest score is chosen as the recognized gesture. Typical input features for models involve position, velocity, and orientation. In order to address the noisy gestures of in-vehicle environments and the issue that a gesture may have several different ways of being written, stroke modeling is used in the system described below. Strokes are often used in systems that recognize Chinese or other Asian written characters. These systems use a lexicon to regulate the way to compose a character with strokes. The same stroke used to form different characters can be shared to train a better stroke model. For the in-vehicle gesture recognition, however, extraneous movements between meaningful strokes are also stored to enable their detection and removal. To deal with the difference between in-vehicle stroke modeling and written text stroke modeling, intermediate strokes that form a gesture are treated as meaningful strokes while building the lexicon. With this framework, the meaningless beginning and ending strokes of the gesture can be handled and re-normalization of meaningful strokes can be done accordingly. In addition, the stroke relationship can be incorporated in the modeling by some geometric properties. Finally, a score fusion with the original whole-letter model is also applicable.

Figure 5:
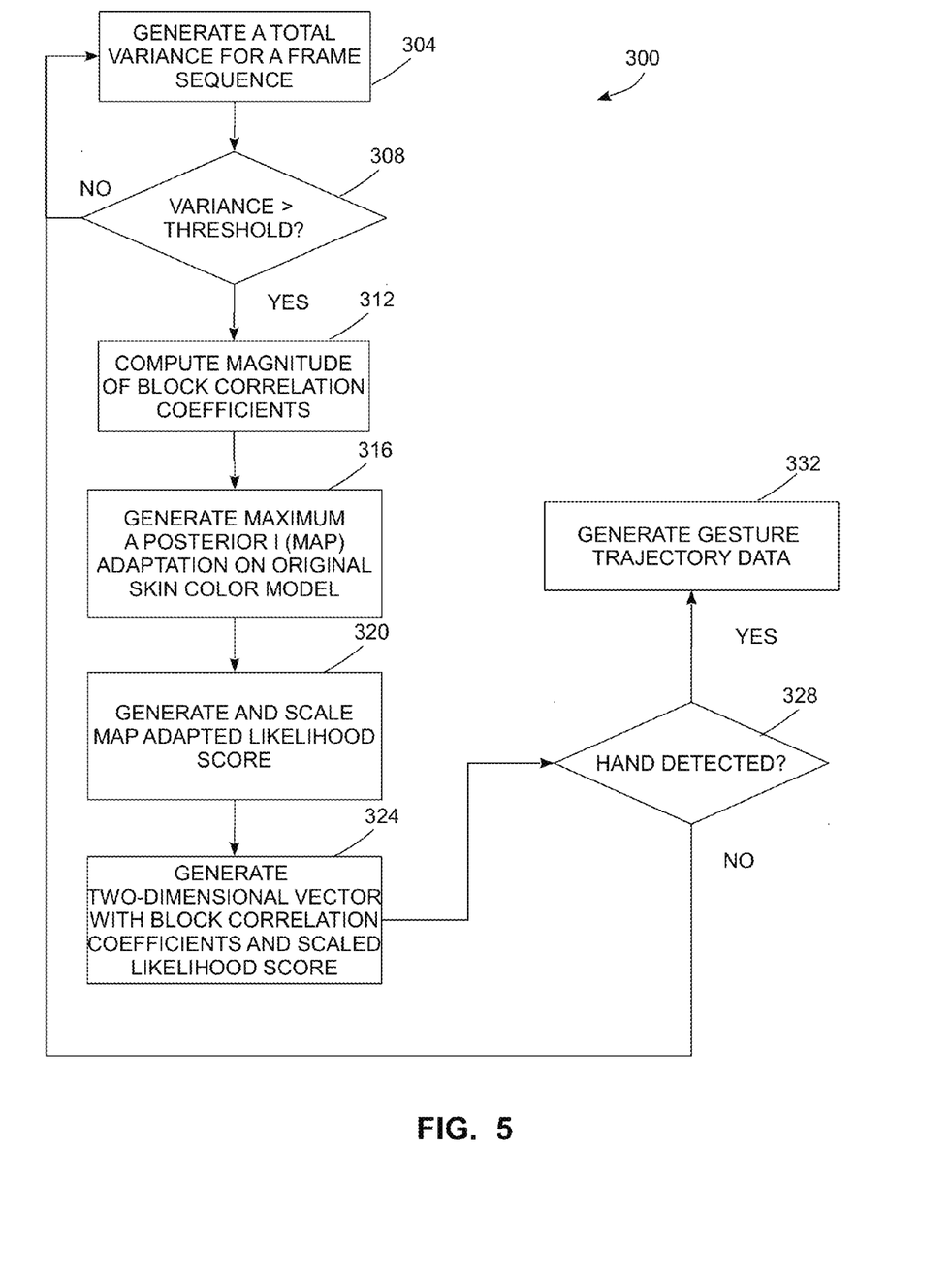
FIG. 5 is a block diagram of a process used in the subsystem of FIG. 2 to detect a hand in a frame sequence.

FIG. 5 depicts a process 300 for identifying the presence of a hand and movement of a hand in a sequence of image frames from a video camera that records an interior surface of a vehicle. In the description below, a reference to process 300 performing a function or action refers to execution of stored program instructions by a controller, such as the controller 148 of FIG. 1, to perform the function or action in conjunction with other components in an in-vehicle information system. Process 300 is described in conjunction with the in-vehicle information system of FIG. 1 and the system of FIG. 2 for illustrative purposes.

During process 300, for a whole frame sequence received from a camera, the controller 148 checks a total variance σ by averaging the squared difference between every pixel of each frame and the background frame (block 304). If σ exceeds a predetermined threshold, the frame is claimed to be a candidate frame in which a hand object is detected (block 308). Otherwise, the process continues to capture frame sequences and check the variance for possible hand objects (block 304). The variance is computed with the assumption that a purely background frame is always given. For each local patch with a predetermined block size, such as four pixels by four pixels, compute the magnitude of the block correlation coefficients |ρ| with the corresponding background block (block 312). A MAP adaptation is generated on the original skin color model (block 316) to reduce the mismatch between the training and image data. The MAP adapted log likelihood score LL of the current block's average RGB value is generated and this score is scaled to produce a normalized log-likelihood score NLL using the following equation: $NLL=(1+e^{(-0.5(LL))})^{-1}$ (block 320). A two dimensional vector is generated with |ρ| and NLL (block 324) and a fusion classifier trained by these features in the training data is used to determine whether a hand has been detected (block 328). The two dimensional vector combines both the background-foreground relationship with the color information so that robustness across different illumination conditions can be achieved. If a hand is detected, the stroke data for the gesture is processed (block 332). Otherwise, another frame sequence is obtained and its variance tested (block 304).

Process 300 generates trajectory data corresponding to the movement of the hand to different locations in the background in a sequence of video frames. The trajectory data include information corresponding to the coordinates of the hand at different locations on the background surface in each frame of the video data, and information about the velocity and acceleration of the hand. Each video frame that includes the hand captures the location of the hand at a predetermined moment in time. The camera 144 generates the frames at a predetermined rate (e.g. 24, 30, or 60 frames per second) and the controller 148 identifies the velocity and acceleration of the hand based on changes in the location of the hand over multiple frames and the predetermined time period that elapses between frames in the video data. In gesture, the direction, velocity, and acceleration of movement of the hand typically change one or more times as the operator performs a series of movements that form a gesture. Individual movements of the hand between two locations in a straight line or along a curved path are referred to as "strokes". The controller 148 generates trajectory data that includes the start and end locations of each stroke, optionally one or more intermediate locations of the hand during a stroke, and acceleration and velocity information pertaining to the movement of the hand during each stroke. While the trajectory data include one or more strokes that form a gesture, the controller 148 performs a decoding process that is described below to decompose the trajectory data for a hand gesture into a sequence of individual strokes.

In order to model hand gestures, a lexicon is first defined for each English letter gesture. For example, the letter P is defined as {START, ↓, ↑, ⊃, END}. Each of the characters in the lexicon is modeled with a series of strokes, and in some embodiments a single character can be modeled using two or more stroke sequences since different human operators may form gestures with different sets of strokes. This process is used to identify the candidates with the two highest stroke scores since these candidates are likely to yield big counts in a confusion matrix. These candidates can then be presented to the user for confirmation as to which one is the correct gesture.

Figure 6:
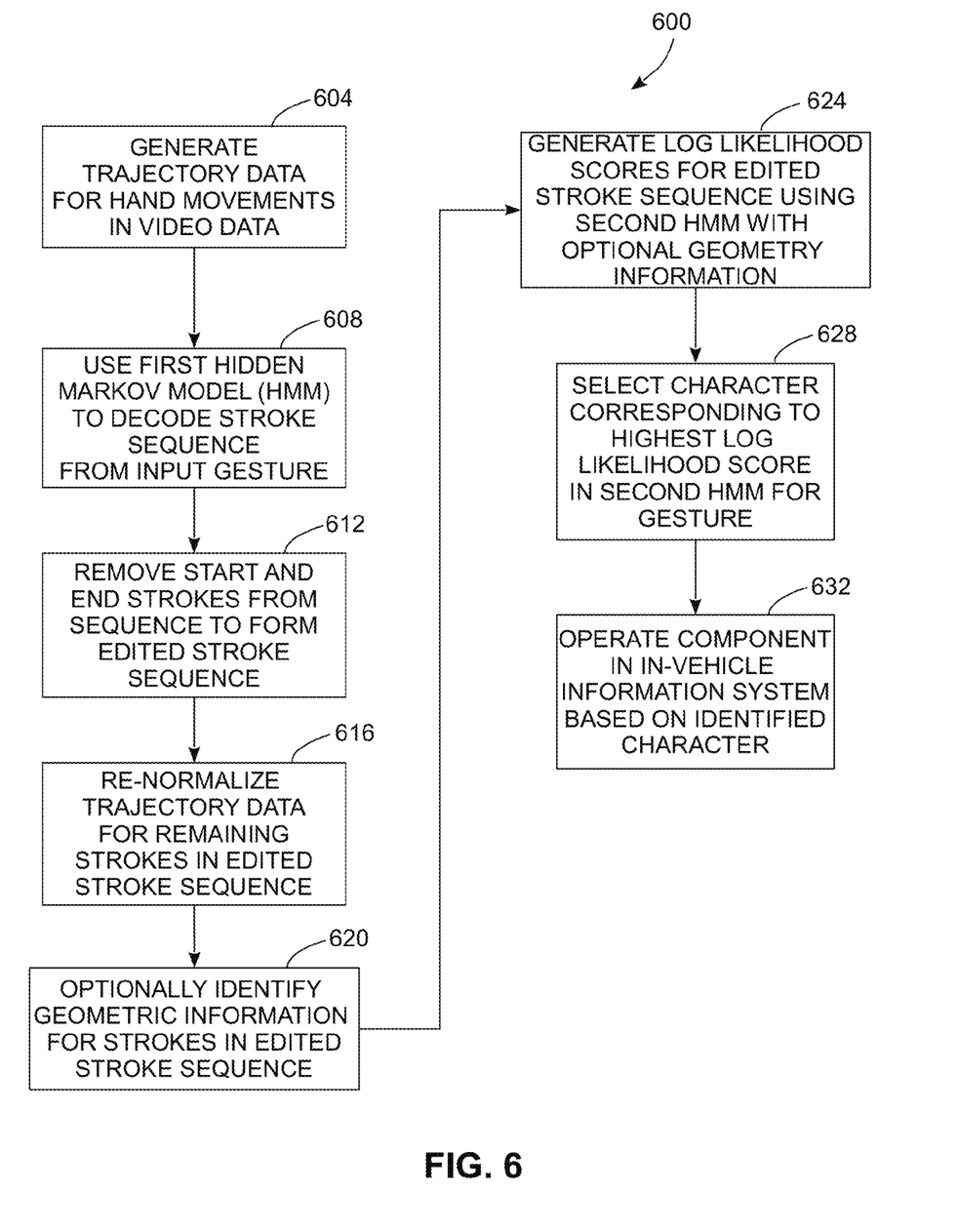
FIG. 6 is a block diagram of a process for character identification in the in-vehicle information system of claim 1 and the subsystem of FIG. 2.

FIG. 6 depicts a process 600 for identifying character input from hand gestures that are performed on an interior surface of a vehicle and recorded by a camera. In the description below, a reference to process 600 performing a function or action refers to execution of stored program instructions by a controller, such as the controller 148 of FIG. 1, to perform the function or action in conjunction with other components in an in-vehicle information system. Process 600 is described in conjunction with the in-vehicle information system of FIG. 1 for illustrative purposes, and process 600 describes the operation of the trajectory understanding module 212 and recognition results module 216 of FIG. 2.

Process 600 begins as the controller 148 receives trajectory data for hand movements that are identified in multiple frames of video data from the camera 144 (block 604). As described above, the controller 148 optionally generates the trajectory data during the process 300. In another embodiment, the controller 148 receives the trajectory data from another computing device that processes image data from one or more video recording devices. The trajectory data include the position of the hand at different time during the video recording, and the trajectory data also include velocity and acceleration data about the movement of the hand.

Process 600 continues as the controller 148 uses a first hidden Markov model (HMM) to analyze the trajectory data and decode individual strokes in the gesture from the trajectory data (block 608). The first HMM is applied to find the log likelihood score for strokes in a gesture corresponding to the ith character in a set of characters corresponding to: $\log[P(o|\Lambda_i^{strokes})] = \Sigma_{k \in D_i} \log[P(o|\Lambda k^{strokes} \cap \Lambda_i)]$ where $D_i$ is a predetermined set of strokes that correspond to the ith character in a lexicon, o is the sequence of identified strokes from the operator, and $\Lambda$ is a set of HMMs for each of the characters in the lexicon. In the system 100, the controller 148 uses the first HMM to decode the full gesture into the individual strokes that form the gesture, including the starting stroke and ending stroke. The strokes are decoded based on the first HMM that is trained from a large set of valid strokes that are used to form characters during a gesture. The controller 148 generates a stroke sequence from the decoded strokes since the trajectory data for different hand movements. Since the video data and trajectory data about the hand are recorded linearly in time, the controller 148 organizes the stroke sequence in time and can identify the starting stroke (earliest stroke in time) and ending stroke (final stroke in time), and the intermediate strokes of the gesture.

Figure 3:
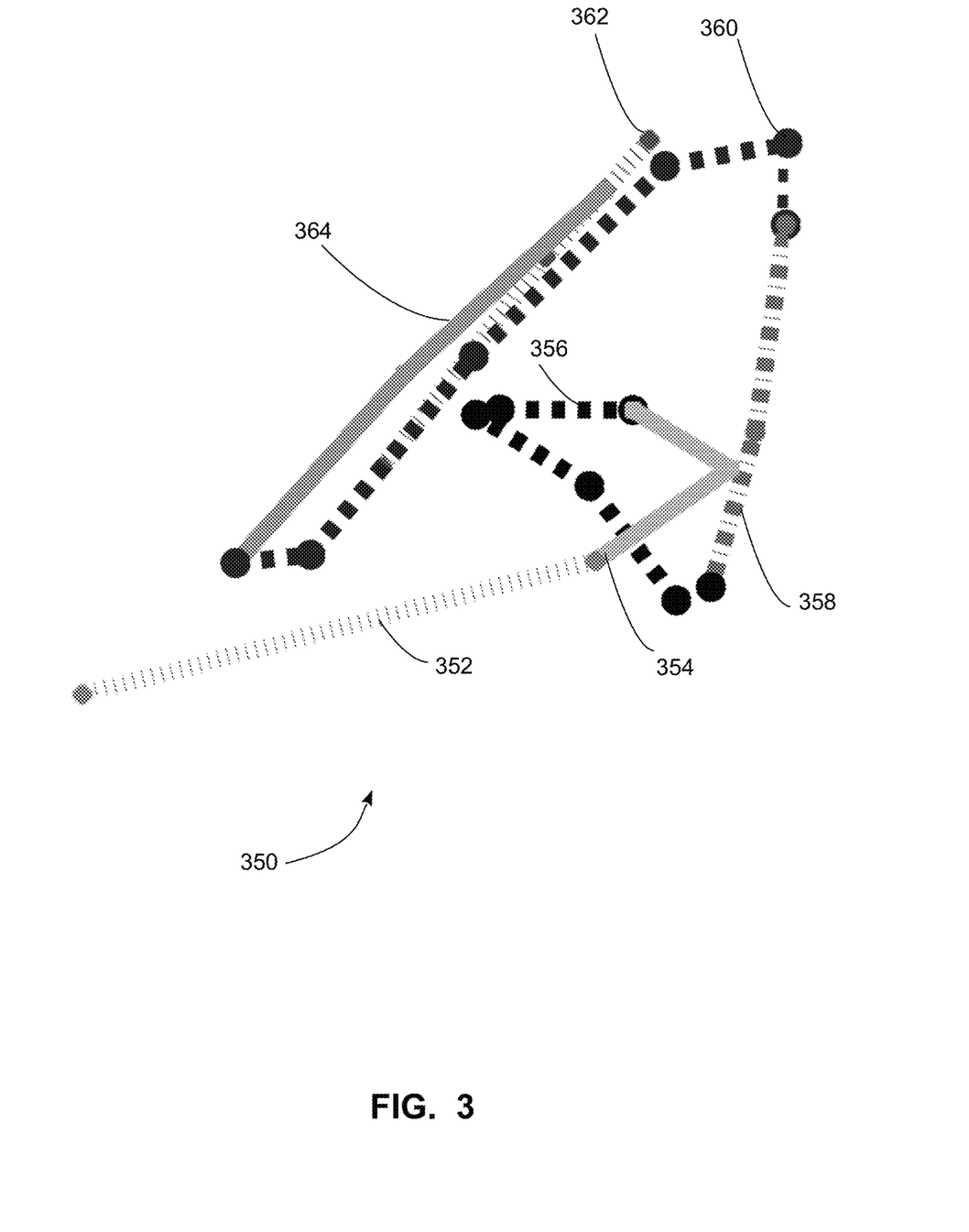
FIG. 3 is a graphical depiction of individual strokes that form a gesture from a vehicle operator.

FIG. 3 depicts a series of strokes that form a gesture 350. The gesture 350 is formed from the strokes 352, 354, 356, 358, 360, 362, and 364. The trajectory data for each stroke include information about the locations of the hand during each stroke in addition to the velocity and acceleration of the hand to form the strokes. In the example of FIG. 3, the stroke 352 is the first stroke and stroke 364 is the final stroke in the sequence of strokes that forms the gesture 350.

Referring again to FIG. 6, process 600 continues as the controller 148 removes start and end strokes from the trajectory data that correspond to the gesture to form an edited stroke sequence (block 612). In many instances, the starting stroke and ending stroke that are recorded as part of a gesture do not contribute meaning to the gesture and increase the likelihood of incorrectly identifying the gesture. For example, the first recorded stroke often corresponds to the operator placing his or her hand on the steering wheel or other surface in the vehicle to form the gesture. The final stroke often occurs as the operator removes his or her hand from the steering wheel or repositions his or her hand to begin forming another character using another gesture. The intermediate strokes that occur while forming the gesture form a more accurate representation of the character that is formed from the gesture when the first stroke and final stroke are included.

Figure 4:
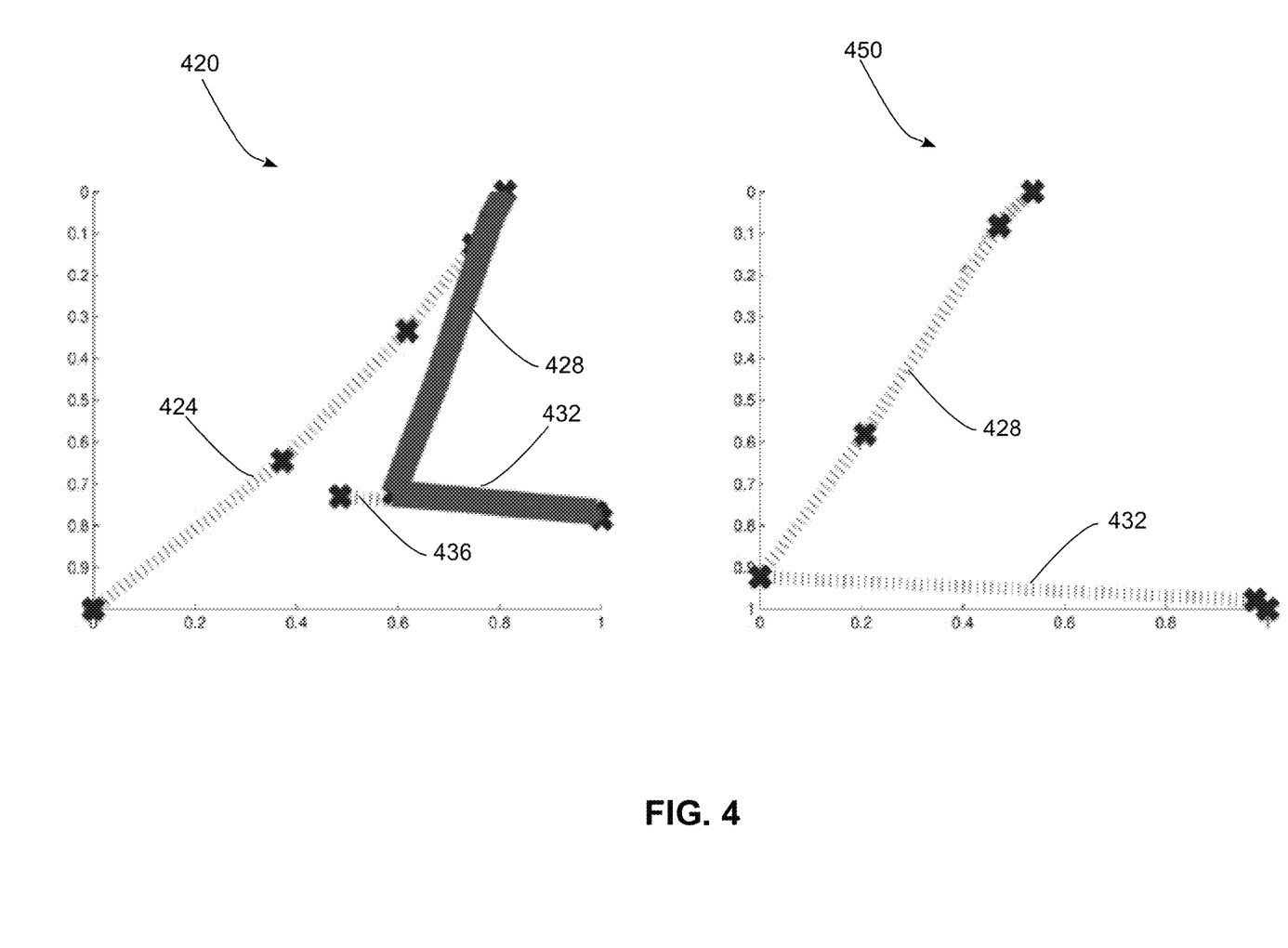
FIG. 4 is a graphical depiction of strokes that form a gesture including starting and ending strokes and another graphical depiction of the gesture after removal of a starting and ending stroke and re-normalization of the remaining strokes.

Process 600 continues as the controller 148 re-normalizes the trajectory data for the remaining strokes in the edited stroke sequence (block 616). The re-normalization process adjusts the relative locations and sizes of the remaining strokes in the stroke sequence to a predetermined coordinate plane for identification of the gesture. FIG. 4 depicts two graphs 420 and 450 of a gesture before and after, respectively, the removal of starting and ending strokes and re-normalization during process 600. In the graph 420, the gesture includes strokes 424, 428, 432, and 436. The strokes 424 and 436 depict the starting and ending strokes, respectively. The graph 450 depicts the intermediate strokes 428 and 432 after the strokes 424 and 436 are removed and the edited stroke sequence is re-normalized. In the example of FIG. 4, the re-normalization sequence repositions the strokes that form the gesture in a relative coordinate plane that extends from 0-1 on the X and Y axes. The re-normalization preserves the relative sizes and positions of strokes but discounts the absolute size of the recorded hand movements that form the gesture and the absolute locations of the hand on the surface in the vehicle while forming the gesture. Both the stroke editing and re-normalization features of process 600 improves the accuracy of character identification based on the hand movements of the operator since an operator in a vehicle often enters strokes for a gesture without looking at his or her hand.

Referring again to FIG. 6, process 600 continues as the controller 148 optionally identifies geometric information corresponding to the trajectory data of the strokes in the edited stroke sequence (block 620). The geometric information refers to the spatial relationships between multiple strokes in the re-normalized stroke sequence. Examples of geometric information that are used for gesture identification include the distances between the end point locations of two strokes, the distances between the end point locations of one stroke to a line that connects the end points of another stroke, the distance between a mid-point of a stroke to the line that connects the end points of another stroke, and a cosine value of the angle that is formed by two intersecting lines that extend through the end points of two different strokes. The end point locations correspond to the beginning and end of each stroke formed by the hand, which is stored as part of the trajectory data for each stroke. In the processing of geometric information, the controller 148 generates lines that connects two locations on a stroke since many strokes have non-linear shapes. In some embodiments, process 600 omits the identification of the geometric information for gesture identification.

Process 600 continues as the controller 148 identifies log likelihood scores for the edited stroke sequence using a second HMM (block 624). The log likelihood for the ith character in a lexicon is expressed with the following equation: $g(o\_|\Lambda_i) = \Sigma_{k \in D_i} \log [P(o\_|\Lambda_k^{stroke} \cap \Lambda_i)]$, where o_ is the edited and re-normalized stroke sequence. In one embodiment, the log likelihood score is also identified with reference to the optional geometry information. The combination of the second HMM with the edited stroke sequence and the geometry information is expressed with the following equation:

$$g(o\_|\Lambda_i) = \sum_{k \in D_i} \log[P(o\_|\Lambda_k^{stroke} \cap \Lambda_i)] + \gamma \sum_{\substack{k,h \in D_i \\ k \neq h}} \log[P(o\_|\Lambda_{k,h}^{geometric} \cap \Lambda_i)],$$

where γ is a positive constant that is typically in a range of [0, 1], and k and h specify different strokes that are selected from the overall set of strokes $D_i$ for the ith gesture to compare the geometric information between strokes for the predetermined characters in the lexicon to the strokes from the input gesture. The comparison to a sequence of individual strokes in the process 600 is simpler and more accurate than prior-art character recognition processes that attempt to match the entire gesture without decomposing the gesture into a simpler sequence of strokes.

After generation of scores for different characters in a predetermined lexicon, such as letters, numbers, and punctuation in English or another language, the controller 148 selects the character with the highest log likelihood score (block 628). Using English as a lexicon, the controller 148 identifies the log likelihood score for each of the letters, numbers, and punctuation that are associated with English input characters as described above with regards to the processing of block 624. The controller 142 selects the character that has the highest log likelihood score for the edited and re-normalized stroke sequence as the input character from the operator.

During process 600, the controller 148 controls the operation of at least one component in the vehicle based on the character input from the operator (block 632). In one embodiment, the controller 148 operates an output device such as the LCD 124 or HUD 120 to generate a graphical display of the character. In some applications, such as messaging applications, the character is displayed with other characters from the operator as the operator enters a text message using gestures. In other configurations, the controller 148 uses the input character to control a component in the vehicle. For example, the system 100 includes various exterior cameras and vehicle sensors 158 that generate video and other information about the environment around the vehicle. An input gesture from the vehicle operator can be used to activate, deactivate, zoom, tilt, or pan the exterior cameras 158 during operation of the vehicle. In one embodiment, the controller 148 recognizes a letter or number input character to control one or more of the cameras 158, while in another embodiment the lexicon includes characters other than standard letters and numbers to enable the operator to enter special gestures to control the cameras 158.

While process 600 is directed to single-character recognition, in another configuration the process 600 generates a multiple results including the score values for each result corresponding to characters with different likelihoods of matching the recorded gesture. For example, one embodiment the controller 148 identifies the two characters with the two highest scores in a "2-best" configuration, and in other configurations up to n characters with the n highest scores are selected for n-best matching. In some applications, such as text-input applications, the character identification accuracy can be improved when a character is received as part of a larger body of text in a predetermined language, such as English. A spell-checker or other suitable process receives the multiple scores for different characters and compares the scores to a predetermined distribution of characters that are expected for words in a language given the characters that have already been received in an input. The spell-checker may select a character that does not have the highest score if the character with the highest score would result in a misspelled word given the context of the other characters that have already been entered.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. An in-vehicle information system configured to receive gesture input comprising:
   a first camera configured to generate image data of an interior surface in a vehicle and a hand of an operator in the vehicle that moves on the interior surface;
   a controller operatively connected to the first camera and at least one component in the in-vehicle information system, the controller being configured to:
      receive a plurality of frames of image data from the first camera;
      identify a location of the hand of the operator in each frame of the plurality of frames;
      generate trajectory data corresponding to changes in the location of the hand in the plurality of frames;
      generate a decoded sequence of strokes for the hand from the trajectory data with reference to a first hidden Markov model (HMM);
      remove at least one of a first stroke and a last stroke from the decoded sequence of strokes to generate an edited sequence of strokes;
      normalize trajectory data associated with each stroke in the edited sequence of strokes;
      identify a character corresponding to the normalized trajectory data associated with the edited sequence of strokes with reference to a second HMM; and
      operate the at least one component in the in-vehicle information system in response to the identified character.

2. The system of claim 1, the controller being further configured to:
   identify geometry information corresponding to the normalized trajectory data associated with each stroke in the edited sequence of strokes; and
   identify the character with reference to the geometry information and the second HMM.

3. The system of claim 2, the controller being further configured to:
   identify the geometry information for one stroke in the edited sequence of strokes with reference to a distance between a first location of one end of one stroke and a second location of another end of another stroke.

4. The system of claim 2, the controller being further configured to identify the geometry information by identifying:
   a first line between a first location of a first end of a first stroke in the edited sequence of strokes and a second location of a second end of the first stroke;
   a second line between a third location of a first end of a second stroke in the edited sequence of strokes and a fourth location of a second end of the second stroke; and
   a cosine of an angle formed by an intersection of the first line and the second line.

5. The system of claim 1, the controller being further configured to:
   identify a velocity and an acceleration of the hand of the operator with reference to an identified change in location of the hand of the operator from a first location to a second location in the plurality of frames and a predetermined time period between frames in the plurality of frames; and
   generate the trajectory data including the first location of the hand, the second location of the hand, and the identified velocity and acceleration of the hand.

6. The system of claim 1, the at least one component further comprising:
   a graphical display device; and
   the controller being further configured to:
   operate the graphical display device to display a graphical depiction of the character.

7. The system of claim 1, the at least one component further comprising:
   a second camera configured to generate video data corresponding to an environment exterior to the vehicle; and
   the controller being further configured to:
   operate the second camera to modify a zoom, pan, or tilt of the second camera with reference to the character.

8. A method for gesture recognition in an in-vehicle information system comprising:
   receiving with a controller a plurality of frames of image data generated by a first camera;
   identifying with the controller a location of a hand of an operator in each frame of the plurality of frames;
   generating with the controller trajectory data corresponding to changes in the location of the hand in the plurality of frames;
   generating with the controller a decoded sequence of strokes from the trajectory data with reference to a first hidden Markov model (HMM);
   removing with the controller at least one of a first stroke and a last stroke from the decoded sequence of strokes to generate an edited sequence of strokes;
   normalizing with the controller trajectory data associated with each stroke in the edited sequence of strokes;

identifying with the controller a character corresponding to the normalized trajectory data associated with the edited sequence of strokes with reference to a second HMM; and operating with the controller at least one component in the in-vehicle information system in response to the identified character.

9. The method of claim 8 further comprising:

identifying with the controller geometry information corresponding to the normalized trajectory data associated with each stroke in the edited sequence of strokes; and identifying the character with reference to the geometry information and the second HMM.

10. The method of claim 9, the identification of the geometry information further comprising:

Identifying with the controller the geometry information for one stroke in the edited sequence of strokes with reference to a distance between a first location of one end of one stroke and a second location of another end of another stroke.

11. The method of claim 9, the identification of the geometry information further comprising:

generating with the controller a first line between a first location of a first end of a first stroke in the sequence of edited strokes and a second location of a second end of the first stroke;

generating with the controller a second line between a third location of a first end of a second stroke in the sequence of edited strokes and a fourth location of a second end of the second stroke; and identifying with the controller a cosine of an angle formed by an intersection of the first line and the second line.

12. The method of claim 8, the generation of the trajectory data further comprising:

identifying with the controller a velocity and an acceleration of the hand of the operator with reference to an identified change in location of the hand of the operator from a first location to a second location in the plurality of frames and a predetermined time period between frames in the plurality of frames; and generating with the controller the trajectory data including the first location of the hand, the second location of the hand, and the identified velocity and acceleration of the hand.

13. The method of claim 8, the operation of the at least one component further comprising:

operating with the controller a graphical display device to display a graphical depiction of the character.

14. The method of claim 8, the operation of the at least one component further comprising:

operating with the controller a second camera configured to generate video data corresponding to an environment exterior to the vehicle to modify a zoom, pan, or tilt of the second camera with reference to the character.

* * * * *